United States Patent

[11] 3,563,181

| [72] | Inventor | Walter F. Mietla<br>Dearborn, Mich. |
|---|---|---|
| [21] | Appl. No. | 781,826 |
| [22] | Filed | Dec. 6, 1968 |
| [45] | Patented | Feb. 16, 1971 |
| [73] | Assignee | Portec Inc.<br>Chicago, Ill. |

[54] LOW CLEARANCE VEHICLE TIEDOWN
10 Claims, 11 Drawing Figs.

[52] U.S. Cl..................................................... 105/369,
105/368
[51] Int. Cl..................................................... B61d 45/00,
B60p 7/00
[50] Field of Search............................................ 105/368
(T), 369 (A), 369 (B); 248/361, 361 (A); 280/179,
179.1; 296/1 (A)

[56] References Cited
UNITED STATES PATENTS
2,879,722  3/1959  Dunlap........................ 105/369(B)
2,891,490  6/1959  Elsner.......................... 105/369(A)
2,969,023  1/1961  Chapman et al.............. 105/368(T)
3,187,686  6/1965  DePodesta.................... 105/368(T)
3,478,995  11/1969  Lautzenhiser et al......... 248/361
994,822  6/1911  Daly............................. 105/369

*Primary Examiner*—Drayton E. Hoffman
*Attorney*—Barnes, Kisselle, Raisch & Choate ABSTRACT: A low silhouette vehicle tiedown device having a frame plate which slidably grips the cross flange of a T-beam of a cargo carrier for movement only along the beam. A dog is mounted for limited universal movement adjacent the plate and is spring biased against the plate. The free end of the dog carries a locking pin which by manipulating the dog is insertable into a hole in the plate for registry of the pin in a hole in the T-beam to lock the tiedown against movement along the T-beam. One or two dogs and variations in plate hole arrangement are disclosed to provide incremental adjustment of the tiedown at intervals less than that of the T-beam hold spacing.

PATENTED FEB 16 1971
3,563,181
SHEET 1 OF 3
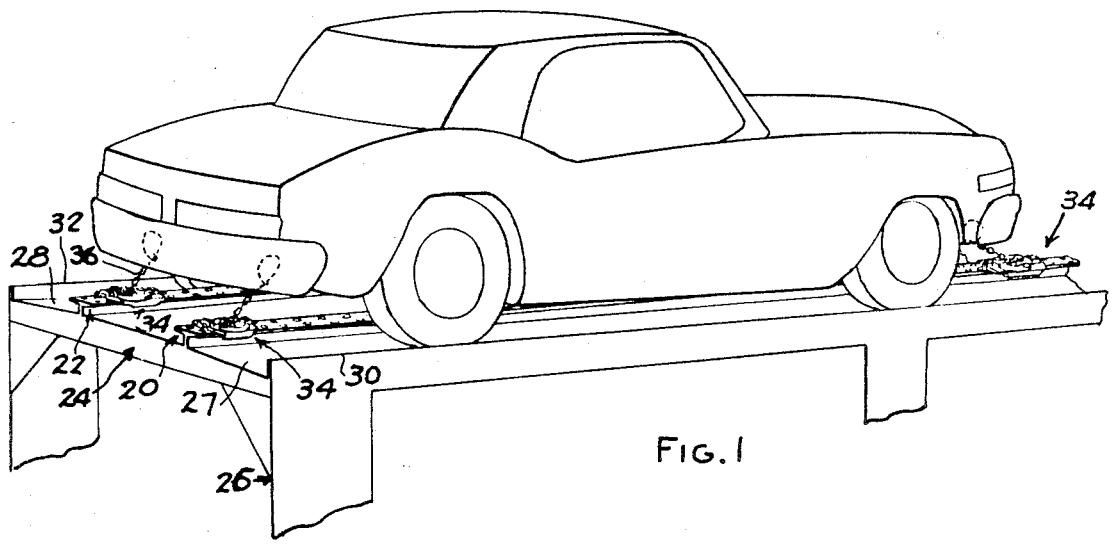
FIG. 1
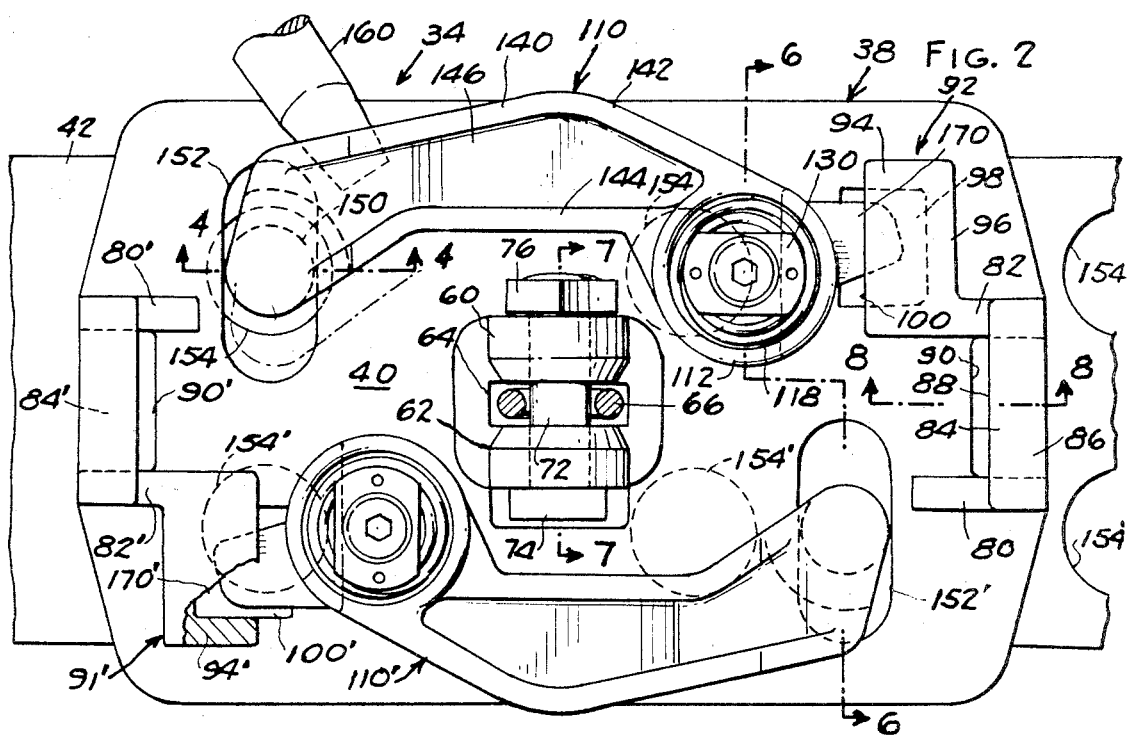
FIG. 2
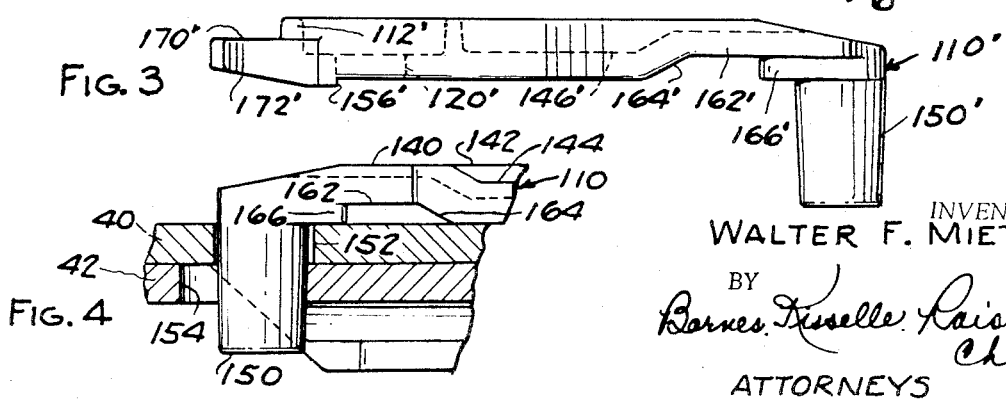
FIG. 3
FIG. 4
INVENTOR.
WALTER F. MIETLA
BY
Barnes, Kisselle, Raisch & Choate
ATTORNEYS

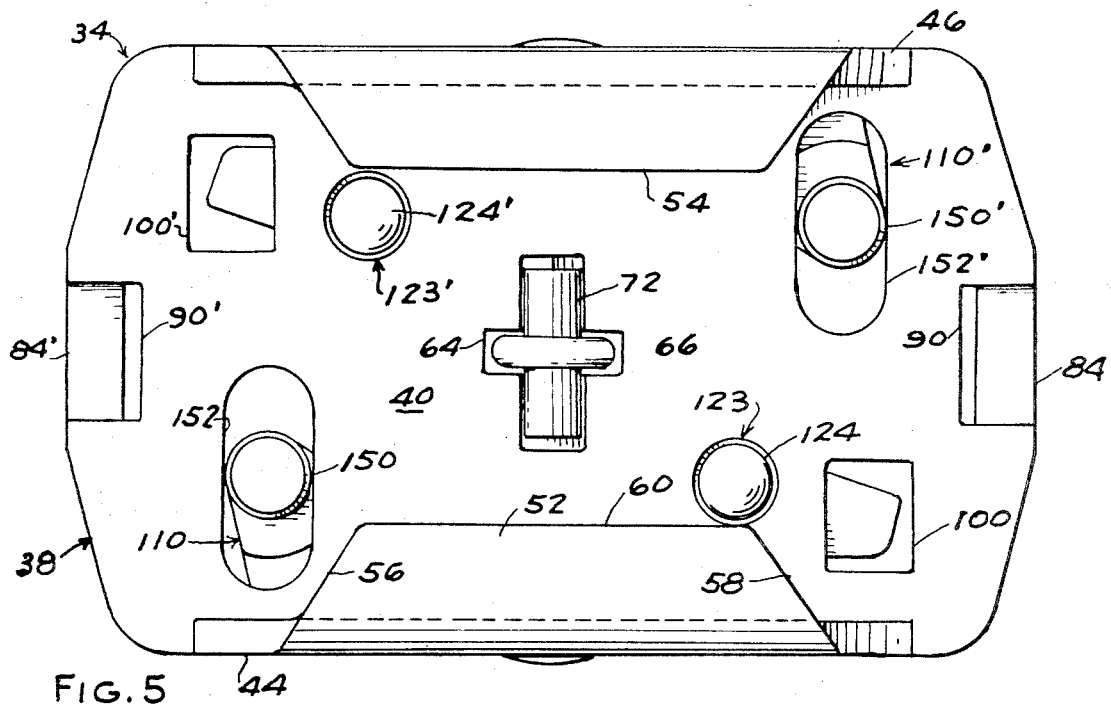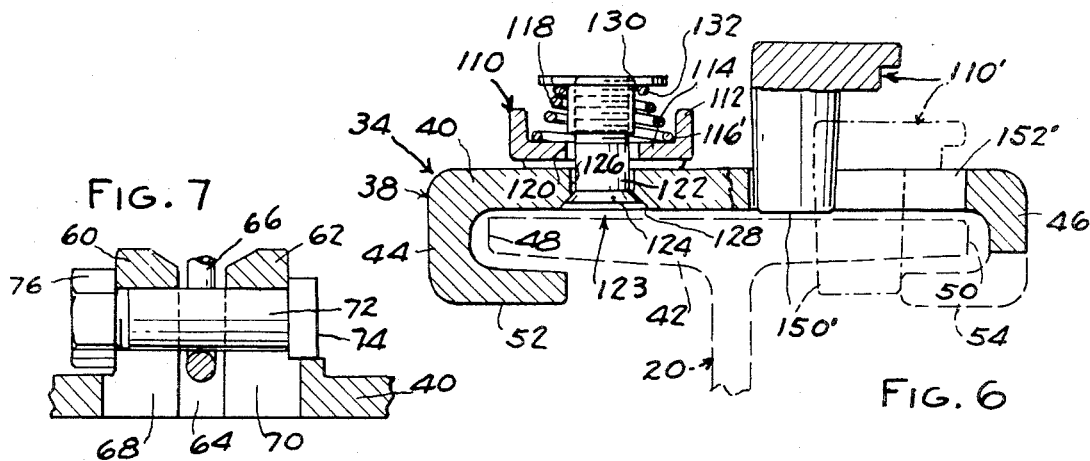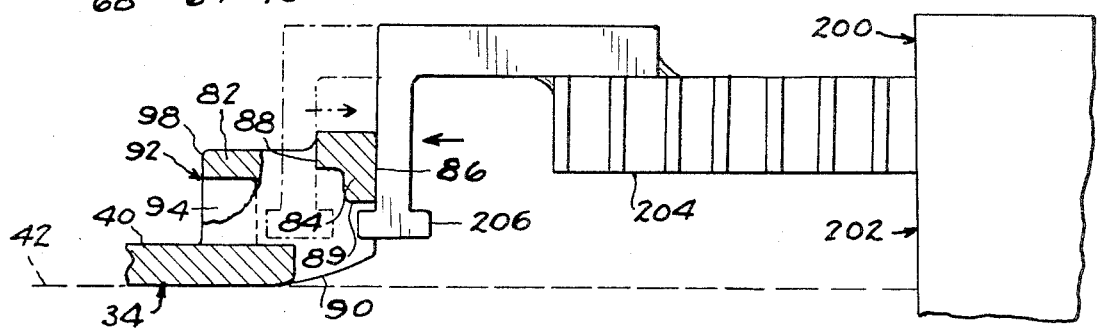

INVENTOR.
WALTER F. MIETLA
BY
Barnes, Kisselle, Raisch & Choate
ATTORNEYS 3,563,181

1

LOW CLEARANCE VEHICLE TIEDOWN

This invention relates generally to apparatus for securing cargo to a carrier conveyance, and more particularly to holddown or tiedown apparatus for securing automotive vehicles during shipment on railway cars or highway hallways.

A large percentage of the automotive vehicles manufactured today are shipped from the point of final assembly to dealers on specially designed multilevel railway or highway carriers, the vehicles usually being end loaded on the carrier by being driven on under their own power and then arranged on each level thereof in tandem relation. In either type of conveyance, it is necessary to provide vehicle tiedown means capable of reliably securing numerous makes and models of vehicles which vary in length, road clearance and weight. One such vehicle tiedown device which has proven very successful is disclosed in U.S. Pat. No. 3,187,686, assigned to the assignee herein.

It is an object of the present invention to provide an improved tiedown apparatus for reliably and economically securing cargo for shipment on carrier conveyances.

Another object is to provide an improved tiedown mechanism adapted to mount on a T-beam rail of the type disclosed in the aforementioned U.S. Pat. No. 3,187,686, but which offers a lower silhouette to accommodate vehicles with very low road clearances in accordance with the prevailing trends in United States passenger vehicle design.

A further object is to provide a tiedown device of the above character adapted to cooperate with a particular form of low clearance jack disclosed in my copending application Ser. No. 781,821 filed Dec. 6, 1968 and assigned to the assignee herein.

Other objects as well as the features and advantages of the present invention will become apparent from the following detailed description taken in conjunction with the accompanying drawings wherein:

FIGS. 1 is a fragmentary perspective view of a deck of railroad automobile loader car provided with T-beam guide tracks and low clearance tiedown devices of the present inventions securing the automobile to the deck of the railroad car.

FIG. 2 is a top plan view, on a greatly enlarged scale, of one of the tiedown mechanisms of the present invention.

FIG. 3 is a side elevational view of one of the locking dogs of the tiedown device shown by itself.

FIG. 4 is a fragmentary vertical sectional view taken on the line 4—4 of FIG. 2.

FIG. 5 is a bottom plan view of the tiedown device of FIG. 2.

FIGS. 6, 7 and 8 are vertical sectional views taken respectively on the line 6—6, 7—7 and 8—8 of FIG. 2, FIG. 8 further illustrating the use of the aforementioned low clearance jack in conjunction with the tiedown device of FIGS. 1—8.

Figure 9:
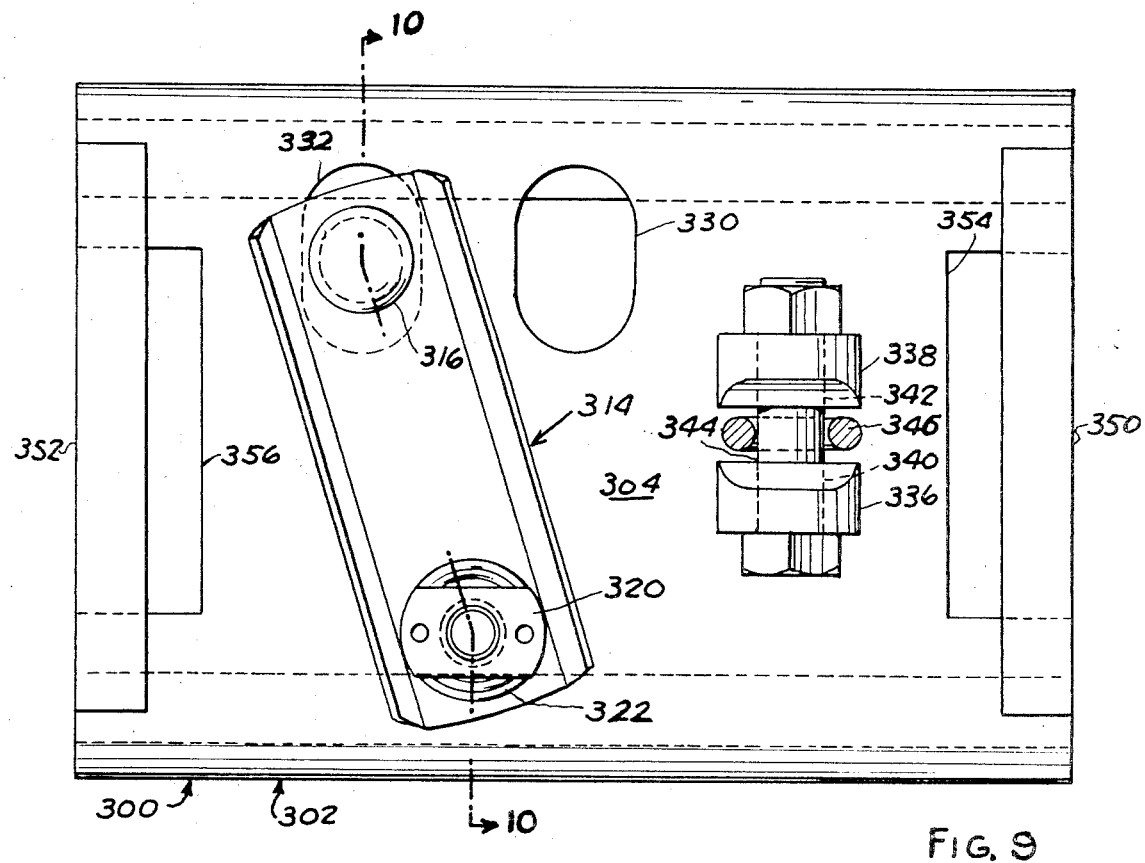

FIG. 9 is a top plan view of a modified form of low clearance tiedown device also in accordance with the present invention.

Figure 10:
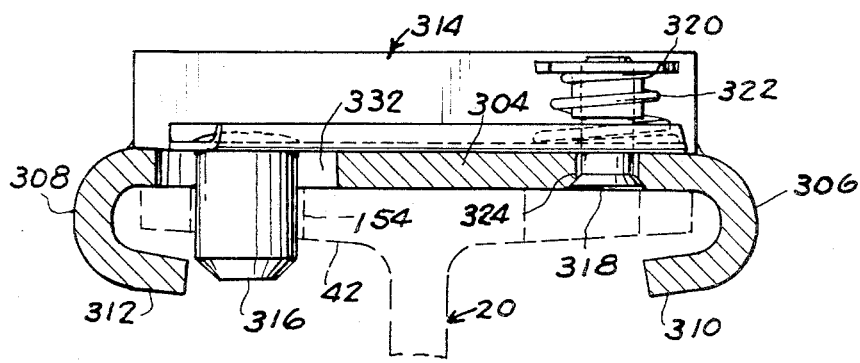

FIG. 10 is a vertical sectional view taken on the line 10—10 of FIG. 9.

Figure 11:
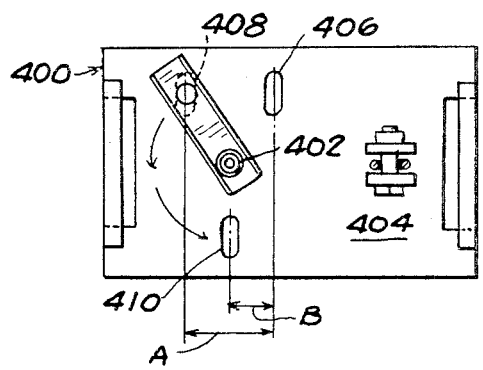

FIG. 11 is a top plan view of a third embodiment of the tiedown device of the present invention.

Referring in more detail to the accompanying drawings, FIGS. 1—8 inclusive illustrate a preferred but exemplary form of a low clearance tiedown device in accordance with the present invention which is particularly well adapted for use on the T-beam type anchoring rail as disclosed in U.S. Pat. No. 3,187,686. As shown in FIG. 1, a pair of such rails 20 and 22 are suitably secured to the deck 24 of a single or multilevel automobile loader railroad car 26 of conventional construction well understood in the art and therefore not shown in full. As is customary, deck 24 has a pair of wheel tracks 27 and 28 bounded along their inner edges by the beams 20 and 22 respectively and along their outboard edges by suitable curb structures 30 and 32. For fast loading of the automobiles in a minimum space on the carrier, it is ordinarily preferred to "circus load" the carrier by driving the automobiles individually onto the end of one of a series of end coupled railroad cars and then along wheel tracks 26 and 28 over suitable bridges spanning from one car to another, each automobile being parked and then tied down behind the preceding automobile in tandem arrangement on deck 24 until all the cars are so loaded.

The herein disclosed embodiments of the holddown or tiedown apparatus of the present invention are particularly adapted to such loading techniques since they have a very low silhouette, i.e., a minimum vertical projection above tracks 26 and 28 so as not to obstruct the passage of automobiles along the deck even when the same are constructed with very small road clearances. As shown in FIG. 11, a preferred form of tiedown apparatus 34 of the invention is provided in sets of four for each vehicle, tiedowns 34 being arranged two behind and two in front of the vehicle with a tiedown chain 36 connecting each tiedown 34 with the frame of the vehicle.

Referring in more detail to FIGS. 2—8 inclusive, tiedown 34 comprises a main body member 38, which may be a steel casting or forging, having a flat plate portion 40 adapted to overlie the horizontal flange 42 of T-beam 20 as best seen in FIGS. 2 and 6. A pair of vertical flanges 44 and 46 extend perpendicularly from plate 40 along the opposite longitudinal side edges thereof and downwardly respectively past the longitudinal side edges 48 and 50 of T-beam 20. Ears 52 and 54 extend horizontally inwardly from the lower edges of flanges 44 and 46 so as to underlie beam flange 42 and thereby restrain upward movement of tiedown 34 within the limits of the sliding clearance provided between beam flange 42 and the juxtaposed surfaces of plate 40 and ears 52 and 54. As best seen in FIG. 5, the fore and aft ends of ears 52 and 54 have tapered edges 56 and 58 which converge toward the inner free edge 60 of the ear.

Referring to FIGS. 2 and 7, a pair of ears 60 and 62 are fixed to and project upwardly from the center of the upper surface of plate 40 and are spaced apart laterally of the plate to provide an opening 64 therebetween adapted to receive the end link 66 of chain 36. Ears 60 and 62 have coaxially aligned openings 68 and 70 for receiving therethrough the shank 72 of a bolt 74 therethrough, a nut 76 being threaded on the bolt to thereby removably secure chain 36 to tiedown 34.

At each of the opposite longitudinal ends of body 38 a combined abutment and hook structure is provided which cooperates with the pushing and pulling implements of the aforementioned low clearance jack. Considering the right-hand structure as viewed in FIGS. 2, 5 and 8, a pair of ribs 80 and 82 project upwardly from plate 40 and are spaced equidistant laterally from the center line of body 38. Ribs 80 and 82 support an abutment bar 84 which extends horizontally between and is integrally joined to the upper outer corners of ribs 80 and 82. Bar 84 has flat vertically extending outer and inner surfaces 86 and 88, and an undersurface 89 which is normally spaced a distance of, for example, eleven-sixteenth inches above the upper surface of beam flange 42 when the tiedown is resting thereon. Plate 40 between ribs 80 and 82 has a notch 90 which extends inwardly to a point slightly rearwardly of the inner surface 88 of bar 84 (FIG. 2). Both ribs project rearwardly beyond notch 90, but rib 82 extends further inwardly to form the inner side wall of a retainer housing 92 (FIG. 2). Housing 92 is also defined by an upright side wall 94 spaced outwardly and parallel to riser 82, a front wall 96 extending between walls 82 and 94 and a top wall 98. The rear side of housing 92 is open, as is the bottom of the housing where an opening 100 is provided through plane 40 to assist in coring the cavity of the housing and also to provide a drain opening so that ice, snow or other debris cannot collect in the cavity defined by housing 92.

The abutment and hook structure at the other end of tiedown 34 (the left-hand end as viewed in FIG. 2) is identical to that described above and therefore like reference numerals are applied with a prime suffix to indicate the corresponding structure. However, the left-hand abutment and hook structure is reversed so that housing 92' is arranged diagonally opposite housing 92.

In order to selectively lock tiedown 34 at uniformly spaced intervals along T-beams 20 or 22, a pair of identical locking dogs 110 and 110' are mounted for limited pivotal and universal movement on the upper side of plate 40 as best seen in FIG. 2. Dog 110 is preferably formed as a one-piece casting or forging and is generally of arcuate configuration as seen in the plan view of FIG. 2. Dog 110 is mounted on plate 40 at the right-hand end of the dog (as viewed in FIG. 2) and for this purpose has a cylindrical rib 112 (FIGS. 2 and 6) which projects above a horizontal bottom wall 114 to define therewith a circular pocket adapted to receive the large diameter bottom convolution 116 of a spiral compression spring 118. A center hole 120 is provided in wall 114 for receiving therethrough with a loose fit the shank 122 of a stud 123 which is inserted upwardly through a hole 126 in plate 40. The head 124 of stud 123 is conically shaped and seats against a chamfer 128 at the lower end of hole 126 to restrain upward movement of the stud. The upper end of stud 123 is threaded so that a flat headed wingnut 130 may be screwed thereon to retain the uppermost convolution 132 of spring 118 beneath the cross arm of nut 130. Spring 118 is thus captured between nut 130 and dog 110 and is assembled with a preload to develop a strong biasing force urging dog 110 down against the upper surface of plate 40.

Dog 110 also includes an arm portion 140 which extends perpendicular to the axis of hole 120. Arm 140 has an I-beam cross-sectional configuration as defined by inner and outer marginal ribs 142 and 144 and a central web portion 146. Rib 144 is indented to provide clearance for nut 76 so that arm 140 may be pivoted about stud 123 counterclockwise as viewed in FIG. 2. to the broken line position thereof shown in FIG. 2. The free end of arm 140 has a locking pin 150 (see FIGS. 3 and 4) which projects downwardly from the underside of the arm, a distance slightly greater than the thickness of plate 40 and flange 42. Pin 150 projects through a slot 152 in plate 40, slot 152 extending laterally of the plate and having its narrow dimension slightly larger than the diameter of the upper end of pin 150.

In FIGS. 2, 4 and 6 dog 110 is shown in locking position in solid lines wherein pin 150 projects downwardly through a registering circular hole 154 in flange 42 of the T-beam 20. The other dog 110′ under these conditions would be pivoted upwardly so that its free end is raised and pin 150′ rests on T-beam flange 42 as shown in solid lines in FIG. 6. In FIG. 4 pin 150 is shown abutting against the right-hand edge of hole 154, indicating a pulling force acting on the tiedown toward the right as viewed in FIG. 3. Due to the clearances and tolerances provided in the connection of dog 110 to body 38, plate 40 can shift to the right when under such a strain, in which event the left-hand side of hole 152 and plate 40 will abut pin 150 as shown in FIG. 3 so that the stress imposed on the tiedown is taken primarily by pin 150. Thus pin 150, rather than arm 110 and stud 123, restrains the tiedown against movement to the right when the pin is so registered in hole 154. Dogs 110 and 110′ are yieldably but reliably maintained in locked position against plate 40 by the force imposed by their springs 118, 118′, each dog 110 and 110′ resting (see FIG. 3 wherein dog 110′ illustrates the structure) on two points of contact, a transverse rib 156′ offset from the stud hole 120′ on the side thereof remote from pin 150′ and a reinforcing rib 166′ adjacent pin 150′ and between pin 150′ and hole 120′. Hence the spring force is exerted between the contact points so that there is not tendency of the dog to wobble.

In order to unlock tiedown 34 for movement longitudinally along T-beam 20, the free end of dog 110 is pried upwardly by inserting a crowbar, screwdriver or other suitable chisel point tool or implement 160 (FIG. 2) in the pry space located vertically between the upper surface of plate 40 and the raised undersurface 162 of arm 140 (FIGS. 3 and 4) of arm of pin 150, located horizontally between the upwardly tapering undersurface 164 and reinforcing rib 166.

When dog 110 is thus pried upwardly at its free end, the large clearance between shank 122 and hole 120 permits this pivotal movement, spring 118 yielding while tending to force the arm back towards flat position. When pin 150 has been lifted sufficiently to raise it clear of hole 154, tiedown 34 will thereupon become unlocked and will slide on the T-beam in the direction of the chain pull, thereby moving pin 150 so that its lower end rests on the imperforate portion of flange 42 between the longitudinally adjacent pair of holes 154 and 155 in flange 42. These holes are spaced apart at equal intervals, for example 3 inches, lengthwise of the T-beam. Hence dog 110 is capable of selectively locking tiedown 34 at 3-inch intervals along the T-beam.

In accordance with one feature of the invention, the companion dog 110′ is arranged to cooperate with dog 110 to permit locking of tiedown 34 at intervals equal to one-half the beam hole intervals, i.e., at intervals of 1½ inches. To accomplish this dog 110′ is mounted on body 38 laterally opposite dog 110 for registry of its pin 150′ with the holes 154′ of the longitudinal row of holes on the other side of T-beam flange 42. Dog 110′ is also offset longitudinally of body 38 relative to dog 110 by a distance equal to one-half the distance between the holes 154, i.e., 1½ inches. Hence when dog 110 has been freed from its locking relation with hole 154 as described above, dog 110′ will have been in unlocked position resting on the upper surface of flange 42 as shown in FIGS. 2 and 6. Thus tiedown 34 upon being unlocked by raising pin 150 will slide in the direction of the chain pull until pin 150′ registers with the next hole 154′, whereupon spring 118′ will force dog 110′ to its locking position by snapping pin 150′ down into hole 154′ as they register to again lock tiedown 34 in this new position on the T-beam. This sequence will alternate as between dogs 110 and 110′ for each increment of adjustment of tiedown 34 along the T-beam.

Dog 110 is limited as to the extent of its lateral pivotal movement about the axis of shank 122 by an ear 170 which projects radially from rib 112 generally opposite to arm 140 and into the cavity of housing 92 as best seen in FIG. 2. Ear 170 is dimensioned to have just enough clearance in the cavity so that when dog 110 is pivoted inwardly or counterclockwise as viewed in FIG. 2, ear 170 will strike wall 94 when pin 150 reaches the inner end of slot 152. Similarly, when dog 110 is swung out or clockwise as viewed in FIG. 2, ear 170 will strike the outer surface of rib 82 when pin 150 reaches the outer end of slot 152. Upward pivotal movement of dog 110 is also limited by ear 170, the rear undersurface 172 (as best seen in FIG. 3 with reference to dog 110′) being tapered so that dog 110 can be rocked upward sufficiently to raise pin 150 up out of hole 154 so that it just clears beam flange 42 but remains in slot 152. Thus when it is desired to quickly relocate tiedown 34 on the T-beam by a distance in excess of several of the holes 154, dogs 110 and 110′ can be rendered inoperative by pivoting them to their extreme inboard positions wherein pins 150 and 150′ are out of longitudinal alignment with their respective rows of holes 154 and 154′. However, such use is infrequent since tiedown 34 normally remains within a foot or less of its final fully tensioned position relative to the vehicles being transported on the carrier.

In order to tension chain 36 when the same is connected between a tiedown 34 and one end of a vehicle made fast at its other end by other tiedown, the tiedown 34 is forced along the T-beam in the chain tightening direction, preferably by use of a low clearance jack disclosed in my copending application, Ser. No. 781,821, filed Dec. 6, 1968. One end of this jack 200 is partially shown in FIG. 8. Briefly, jack 200 has a body 202 which is placed on the T-beam and studs which drop into laterally opposed T-beam holes 154 and 154′ to hold the jack in place against movement in the plane of flange 42. A rack bar 204 of jack 200 is then operated to bring the special push-pull head 206 of the jack against surface 86 of bar 84 when it is desired to push tiedown 34 along the T-beam away from body 202 while the chain is connected between the tiedown and vehicle, thereby tensioning the chain. If the adjustment calls for pulling the tiedown 34 toward body 202, head 206 is dropped behind bar 84 so as to abut surface 88, thereby hooking the jack to the tiedown so that it can exert a pulling force on the same when the jack is operated. Due to the limited pivotal movement of dogs 110 and 110′, they normally will remain centered with their respective pins 150 and 150' positioned to drop into the first T-beam hole with which they come into registry as the tiedown is jacked along the beam. In most instances, the tiedown need only be moved from the position where chain 36 is "hand taught" about 1½ inches, this movement of the tiedown being sufficient to pull the vehicle down far enough on its springs to maintain proper tension in the tiedown chain 36 for shipment of the vehicle.

FIGS. 9 and 10 illustrate a modified low clearance tiedown 300 also constructed in accordance with the present invention which is made up of stampings and cold formed parts as distinguished from cast and/or forged parts of tiedown 34. Tiedown 300 comprises a body 302 having a flat top plate 304, bent down side flanges 306 and 308 and inturned ears 310 and 312 which embrace flange 42 of T-beam 20 (FIG. 10). Tiedown 300 has only one locking dog 314 with a locking pin 316 welded to its free end. Dog 314 is pivoted for limited universal movement at its other end by a stud 318, nut 320 and spring 322 arranged in a manner identical to the corresponding parts of the previous embodiment. Thus pivot stud 318 is inserted through a hole 324 in plate 304 located near one side edge of plate 304, but dog 314 lies or extends transversely across plate 304 instead of lengthwise of the plate as in the previous embodiment. Plate 304 is provided with two transversely extending slots 330 and 332 spaced longitudinally of the plate from center to center by half the distance between a longitudinally adjacent pair of T-beam holes 154. With this arrangement, dog 314 may be pivoted upwardly by raising the free end with a pry tool, thereby pulling pin 316 upwardly out of the T-beam and then out of slot 332, whereupon dog 314 may be pivoted or swiveled about the axis of pin 318 to either drop pin 316 on the surface of plate 304 or to drop into the other slot 330. In this manner dog 314 may be swung to bring pin 316 over whichever of the plate openings 330 and 332 is in registry with an underlying T-beam hole 154, and dog 314 then released so that under the bias of spring 322 it is forced flat against plate 304, thereby driving pin 316 through the selected plate slot into the T-beam hole and thus locking the tiedown 300 in its new position.

Due to the provision of the two plate slots 330 and 332, tiedown 300 can be adjusted and locked at 1½ inch intervals even though the T-beam holes 154 are spaced at 3-inch intervals, thus providing a finer adjustment of the tiedown.

As in the previous embodiment, tiedown 300 has a pair of ears 336 and 338 welded on plate 304 and provided with coaxial holes 340 and 342 respectively for receiving a chain bolt 344 to secure the end link 346 of the tiedown chain to the tiedown, the other end of the chain being suitably secured to the vehicle. Also, tiedown 300 has a pair of abutment bars 350 and 352 secured respectively to the right and left-hand ends of the tiedown as viewed in FIG. 9, the ends of these bars being welded to the plate and the bar extending over the associated notch 354 or 356 to thereby provide a hook-abutment structure adapted to cooperate with the push-pull implement of jack 200 as described previously.

FIG. 11 illustrates a further modified low clearance tiedown 400 also constructed in accordance with the present invention which is similar to tiedown 300 except that the pivot stud 402 is mounted centrally of plate 404 instead of to one side and the plate 404 is provided with three transversely extending slots 406, 408 and 410. Slots 406 and 408 are aligned longitudinally of plate 404 on one side of the plate 404 for registry with T-beam holes 154, and slot 410 is disposed near the opposite side edge of plate 404 for registry with the other row of T-beam holes 154'. Slots 406 and 408 are spaced longitudinally of plate 404 by a distance A equal to two-thirds of the center to center spacing distance of adjacent holes 154. Slot 410 is offset longitudinally between slots 406 and 408 such that the distance B between the center of slot 410 and slot 406 longitudinally of plate 404 is one-third the center to center distance between the T-beam holes. This provides a three position incremental adjustment of tiedown 400 relative to the hole spacing in the T-beam. For example, in the case of a T-beam hole spacing of 3 inches, distance A would be 2 inches and distance B would be 1 inch, in which case tiedown 400 could be adjusted along beam 20 at 1-inch increments.

From the foregoing description, it now will be apparent that the low clearance vehicle tiedown apparatus of the present invention provides a strong, reliable, easy to operate device of economical construction which presents a very low vertical silhouette to afford maximum clearance between the vehicle holddown structure and the under body structure of the vehicle. By utilizing the principle of a jack for moving the tiedown along the T-beam while the chain is secured between the tiedown and vehicle, with the vehicle restrained at the opposite end thereof against movement by companion tiedown devices, the vehicle may be pulled down on its springs to secure it for shipment without requiring a winch or windlass mechanism usually provided on each holddown of the prior art. This not only simplifies the tiedown device itself but assists greatly in reducing the vertical dimension of the device as disclosed herein.

The provision of the pair of reversely arranged dogs of tiedown 34, with the longitudinal staggering of the dogs, or the single dog and multiple hole arrangements of tiedown 300 and 400, permits incremental adjustment of the tiedown, thereby rendering rolling stock already equipped with standard T-beams having 3 inch hole spacing compatible with the aforementioned technique of tensioning the tiedown and chains by jacking the tiedown device along the T-beam. The push-pull abutment and notches at the opposite ends of the various embodiments of the tiedown device of the invention permit maximum flexibility in conjunction with the tensioning jack. The notches beneath the abutment bars not only cooperate with the hook in the pull mode of operation to prevent the same from jumping up, but also provide a knockout hole for snow and ice so that the tiedown is easy to manipulate under the severest weather conditions. The provision of the locking pin on the underside of the dog, with the dogs being top mounted on the plate and spring biased downward, also assists in clearing the plate slots and T-beam holes of snow and ice, usually as an incident to operating the tiedown in the normal manner.

I claim:

1. A low silhouette tiedown for securing cargo to a cargo carrier having an anchoring beam extending longitudinally adjacent a cargo receiving space of the carrier with an outer surface facing the cargo and a pair of laterally spaced side edges extending longitudinally thereof with a plurality of locking recesses in said outer surface arranged at equally spaced intervals in a row extending lengthwise of said anchoring beam parallel to said side edges, said low silhouette tiedown including a low profile frame slidable engaging said beam and embracing said side edges thereof to capture said tiedown on said beam for longitudinal sliding movement along said beam and to limit movement of said tiedown transversely of said beam, said frame including a plate portion disposed slidably adjacent said outer surface of said beam having at least one through opening laterally aligned with the row of recesses and having a dimension in the direction of said row generally equal to the corresponding dimension of each of said recesses, a locking dog, means mounting said dog on said plate on the side thereof remote from said beam outer surface for swivel movement adjacent said plate about an axis perpendicular thereto and for pivotal movement about an axis parallel to said plate, a projection carried by said dog spaced remote from said pivotal and swivel axes thereof and registrable with said plate opening by swiveling said dog and insertable through said opening into a registered beam recess by pivotal manipulation of said dog to thereby lock said tiedown device against longitudinal movement relative to said beam, spring means biasing said dog toward said plate and tending to force said projection through said plate opening into said recess, and flexible connector means mounted on said frame for connecting said tiedown device to the cargo whereby said tiedown device is adapted to provide a longitudinally adjustable coupling between the cargo and the carrier, said plate having first and second push-pull abutment structures rigidly secured upright one to each of the opposite longitudinal ends of said plate, each of said abutment structures comprising an abutment bar oriented to extend parallel to said outer surface of said anchoring beam and to be spaced vertically thereabove when said plate is resting slidably on said beam outer surface, said connector means, said mounting means, said spring means and said dog being located on said plate longitudinally between said abutment structures and projecting from said plate a distance which at a maximum is generally flush with said abutment structure.

2. The combination as set forth in claim 1 wherein said tiedown is adapted for use with an anchoring beam of the type having a second longitudinally extending row of recesses parallel to said first row and arranged in laterally juxtaposed pairs with the recesses of each pair in longitudinal alignment, said tiedown having a second dog, second means mounting said second dog on said remote side of said plate for swivel and pivotal movement adjacent said plate in the manner of said first dog, said first and second dogs being mounted in reversed relation to one another, said plate having a second opening disposed diagonally opposite said first opening, said second dog having a projection spaced remote from said swivel and pivotal axes thereof registrable by swivel movement of said second dog with said second opening and insertable therethrough upon pivotal manipulation of said second dog, said second plate opening being spaced longitudinally of said plate from said first plate opening a distance equal to about one and one-half the longitudinal spacing between a longitudinally adjacent pair of the recesses in said second row.

3. The combination as set forth in claim 2 wherein said first and second means mounting said dogs to said frame each comprise a circular pocket in the associated dog having a center aperture, a stud mounted on said plate and extending through said center aperture with a clearance fit and a retainer secured to said stud above said pocket, said spring means comprising first and second coil springs respectively, one encircling each of said studs and abutting at one end against the associated pocket and at the other end against the associated retainer to bias the associated dog toward said plate.

4. The combination as set forth in claim 2 wherein each of said dogs has an arm extending from its associated mounting means of generally arcuate configuration and disposed with its convex side outwardly of said plate and its concave side facing inwardly toward the concave side of said other dog, said connector means being secured to said plate centrally thereof in the space between said concave sides of said dogs.

5. The combination as set forth in claim 4 wherein said connector means comprises a pair of upright ears, said ears being spaced apart to receive said flexible means therebetween, said ears having a pair of aligned holes for receiving a fastener pin therethrough for securing said flexible means to said ears.

6. The combination as set forth in claim 4 wherein each of said dogs has an ear projecting radially of the swivel axis thereof opposite said arm of said dog, and said frame includes first and second stops disposed with said ear received therebetween and adapted to limit swivel movement of said dog about the axis of said stud to thereby limit movement of the associated pin laterally of said plate to the vicinity of the associated through opening of said plate.

7. The combination as set forth in claim 6 wherein said stops comprise a retainer housing having spaced side walls respectively defining said first and second stops, one of said side walls forming a support for one end of said abutment bar, said plate having two through opening located one below each of said retainer housings and the associated dog ear.

8. The combination as set forth in claim 6 wherein each of said dog ears has a surface disposed to contact said plate on the side of the pivot axis of the associated dog remote from the associated arm, and each of said arms has a reinforcing portion at the junction of its projection with the free end of the associated arm, each said reinforcing portion having an undersurface adapted to contact the upper surface of said plate.

9. The combination as set forth in claim 1 wherein said plate has a second through opening spaced longitudinally of the plate from said first through opening and aligned with said row recesses, the longitudinal spacing between said first and second openings being less than that between a longitudinally adjacent pair of said recesses, said dog being mounted for swivel and pivotal movement such that said projection is registrable with either of said through openings in said plate.

10. The combination as set forth in claim 9 wherein said tiedown is adapted for use with an anchoring beam having a second longitudinal row of recesses parallel to said first row and individually laterally juxtaposed to the recesses of the first row to form pairs of recesses in longitudinal alignment and wherein said plate has a third opening disposed laterally opposite and longitudinally intermediate said first and second plate openings and aligned with said second row of holes in said beam, said dog being swivel and pivotally mounted such that swivel movement of said dog carries said projection through an arc of travel intersecting each of said plate openings and said dog is pivotable to selectively insert said projection through any one of said openings.